(12) United States Patent
Frampton

(10) Patent No.: US 9,816,516 B2
(45) Date of Patent: Nov. 14, 2017

(54) FAN ASSEMBLY HAVING AN IMPROVED SUPPORT ARRANGEMENT

(71) Applicant: Fanimation, Inc., Zionsville, IN (US)

(72) Inventor: Thomas Frampton, Carmel, IN (US)

(73) Assignee: Fanimation, Inc., Zionsville, IN (US)

( * ) Notice: Subject to any disclaimer, the term of this patent is extended or adjusted under 35 U.S.C. 154(b) by 483 days.

(21) Appl. No.: 14/510,328

(22) Filed: Oct. 9, 2014

(65) Prior Publication Data

US 2016/0102670 A1   Apr. 14, 2016

(51) Int. Cl.
*F04D 25/08* (2006.01)
*F16M 13/02* (2006.01)
*F04D 29/60* (2006.01)

(52) U.S. Cl.
CPC ......... *F04D 25/088* (2013.01); *F04D 29/601* (2013.01); *F16M 13/027* (2013.01)

(58) Field of Classification Search
CPC .................................................. F04D 25/088
See application file for complete search history.

(56) References Cited

U.S. PATENT DOCUMENTS

| | | | | |
|---|---|---|---|---|
| 4,714,230 A * | 12/1987 | Huang | ................. | F04D 25/088 248/343 |
| 6,102,663 A * | 8/2000 | Wang | .................... | F04D 25/088 403/114 |
| 6,116,559 A * | 9/2000 | Lackey | ................. | F04D 25/088 248/343 |
| 6,200,095 B1 * | 3/2001 | Bucher | ................. | F04D 25/088 416/244 R |
| 6,598,846 B1 * | 7/2003 | Lackey, Jr. | ........... | F04D 25/088 248/343 |
| 7,104,513 B2 * | 9/2006 | Blateri | ................. | F04D 25/088 248/342 |
| 7,527,232 B2 | 5/2009 | Frampton et al. | | |
| 7,874,798 B2 | 1/2011 | Frampton et al. | | |
| 7,887,293 B2 * | 2/2011 | Frampton | ............. | F04D 25/088 248/342 |

* cited by examiner

*Primary Examiner* — Woody Lee, Jr.
(74) *Attorney, Agent, or Firm* — Maginot, Moore & Beck LLP

(57) ABSTRACT

A support assembly for a fan includes a hanging member, an elongate support member, a resilient interface member, and a fastener member. The hanging member has a support surface and an inner circumferential surface defining a central passage. The elongate support member includes a first end portion and a second end portion, the first end portion extending into the central passage and defining a first fastener aperture and a second fastener aperture. The resilient interface member is interposed between the elongate support member and the central passage, includes a first plurality of outwardly extending ribs configured to engage the inner circumferential surface in the central passage, and defines a third fastener aperture substantially aligned with the first fastener aperture and a fourth fastener aperture substantially aligned with the second fastener aperture. The fastener member extends through the fastener apertures and is supported by the support surface.

16 Claims, 5 Drawing Sheets

FAN ASSEMBLY HAVING AN IMPROVED SUPPORT ARRANGEMENT

BACKGROUND

The present disclosure relates generally to fan assemblies, and more particularly, to support arrangements for fans.

Artificially induced airflow has long been used to cool people in warm weather. With mass production of small electrical motors, fans have come into wide spread use. Fans increase airflow thereby enhancing evaporative cooling on a person's skin. On the other hand, fans may be used to provide a heating effect. In particular, ceiling mounted fans may be operated to move warm air from an area adjacent a room ceiling downwardly to lower portions of the room.

Many fans are suspended from overhead structures such as ceilings or sloped walls. One goal of fan designers is to create quieter fans such as suspended fans having reduced vibrational noise created during operation thereof. Another goal of fan designers is to develop suspended fans that have less motional wavering during operation thereof. Still another goal of fan designers is to develop suspended fans that are easier to assemble by a customer. Yet another goal of fan designers is to develop suspended fans that are adapted to be mounted to conventional horizontally-oriented ceilings or alternatively sloped ceilings with common mounting components.

What is needed therefore is an improved fan assembly. What is also needed is a suspended fan assembly that is quieter and has reduced vibrational noise during operation thereof. What is additionally needed is a suspended fan assembly that has reduced motional wavering during operation thereof. What is also needed is a suspended fan assembly that is easier to assemble by a customer.

SUMMARY

In accordance with one embodiment of the disclosure, there is provided a support assembly for a fan. The support assembly includes a hanging member including a support surface and an inner circumferential surface defining a central passage. The support assembly further includes an elongate support member having a first end portion and a second end portion, the first end portion extending into the central passage and defining a first fastener aperture and a second fastener aperture located circumferentially opposite from one another. In addition, the support assembly includes a first resilient interface member interposed between the elongate support member and the inner circumferential surface of the hanging member, including a first plurality of outwardly extending ribs configured to engage the inner circumferential surface in the central passage, and defining a third fastener aperture substantially aligned with the first fastener aperture and a fourth fastener aperture substantially aligned with the second fastener aperture. Also, the support assembly includes a first fastener member extending through the first, second, third, and fourth fastener apertures and supported by the support surface of the hanging member.

DETAILED DESCRIPTION

Figure 1:
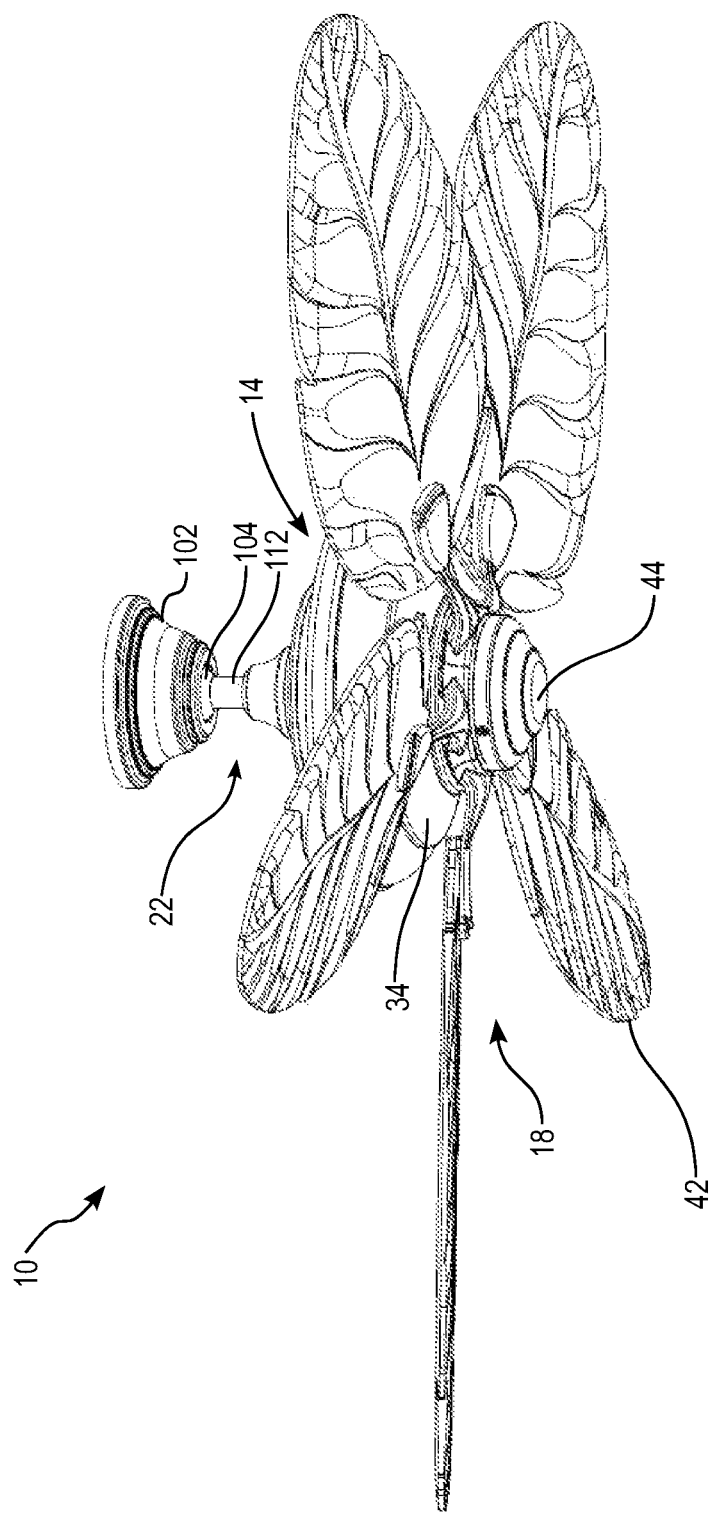
FIG. 1 is side perspective view of a fan assembly according to the present disclosure.

While the assembly described herein is susceptible to various modifications and alternative forms, specific embodiments thereof have been shown by way of example in the drawings and will herein be described in detail. It should be understood, however, that there is no intent to limit the assembly to the particular forms disclosed, but on the contrary, the intention is to cover all modifications, equivalents, and alternatives falling within the spirit and scope of the invention as defined by the appended claims.

Figure 2:
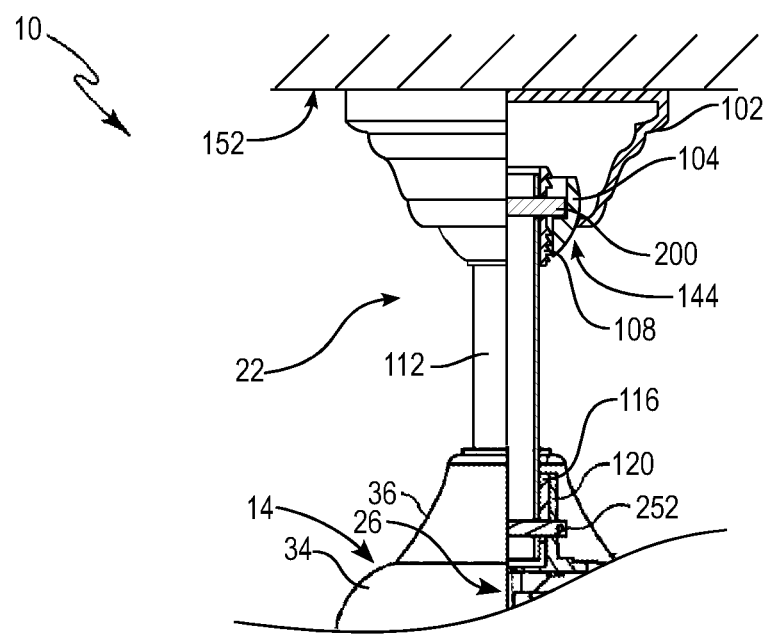
FIG. 2 is partial side elevational, partial cross sectional view of the fan assembly according to the present disclosure.

A side perspective view of a fan assembly 10 is depicted in FIG. 1 and a partial cutaway view of the fan assembly is illustrated in FIG. 2. The fan assembly 10 includes a motor assembly 14, a fan blade assembly 18, and a fan support assembly 22. In some embodiments, the fan assembly 10 is operable to move the fan blade assembly 18 in a cyclic movement.

Movement of the fan blade assembly 18 is enabled by the configuration of the motor assembly 14. The motor assembly 14 includes a motor 26 (only a portion of which is visible in FIG. 2) having a rotatable output shaft (not shown) which is switched between an "off" state and an "on" state by a switch or other toggle mechanism. The motor assembly 14 is protected by a housing 34, which defines a cavity in which the motor 26 is mounted. In some embodiments, the housing 34 includes a skirt 36 that covers the lower portion of the fan support assembly 22 and is movable axially relative to the housing 34.

The fan blade assembly 18 includes a plurality of fan blades 42, each of which is connected to a hub 44, which is coupled to the output shaft (not shown) of the motor 26. Rotation of the output shaft causes rotation of each of the fan blades 42 in a recirculating path of movement.

Figure 3:
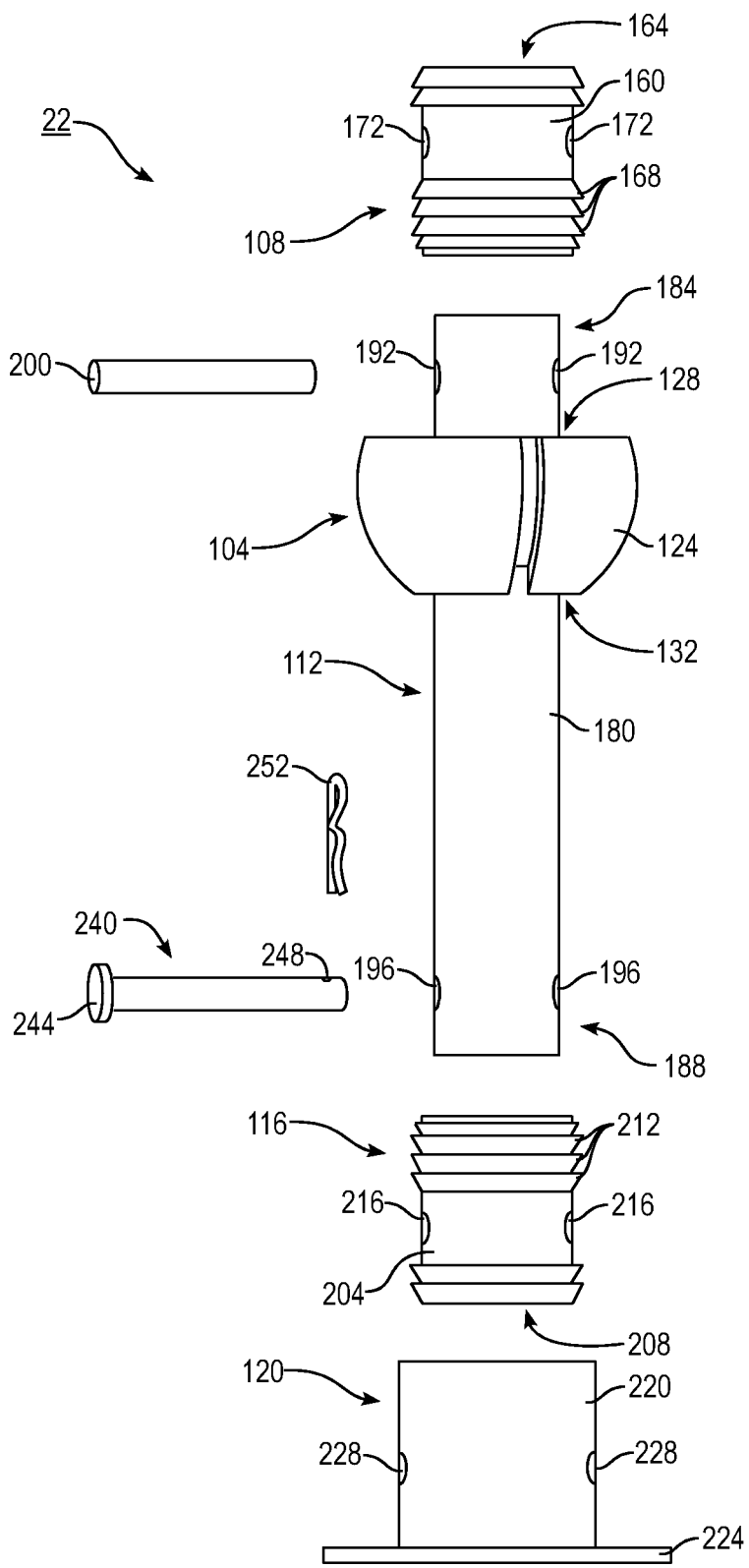
FIG. 3 is an exploded side view of the fan support assembly of the fan assembly of FIG. 2.
Figure 4:
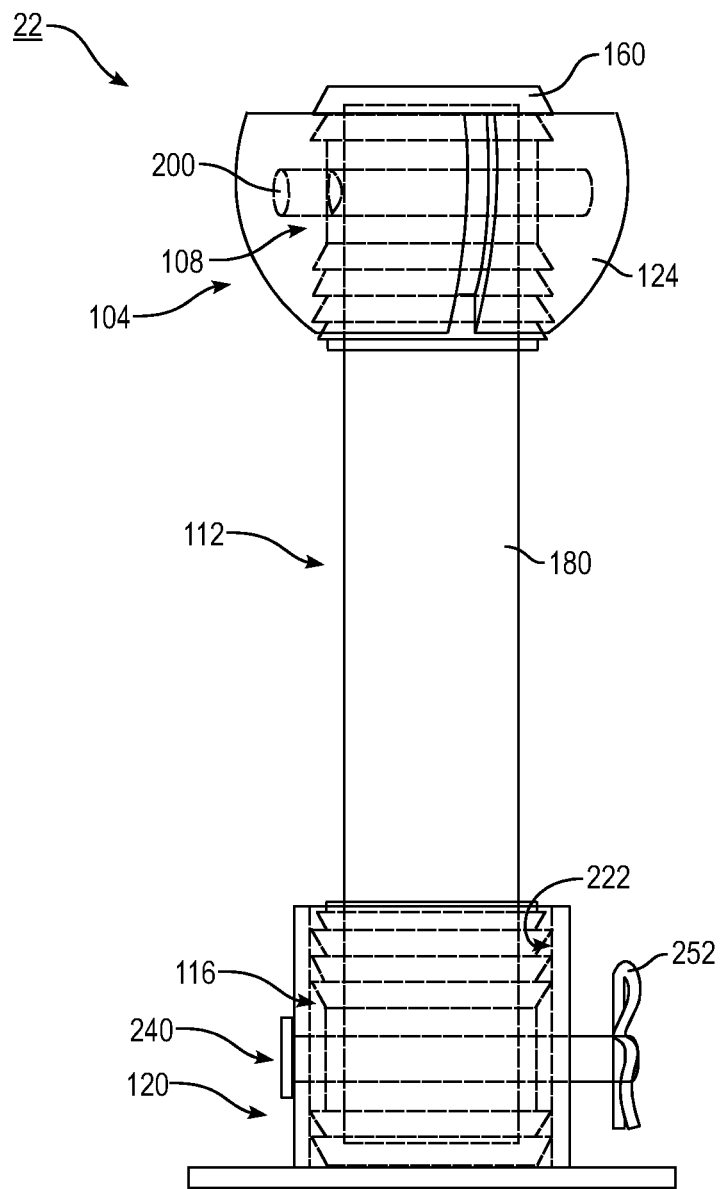
FIG. 4 is a side view of the fan support assembly of FIG. 3 shown in an assembled state.
Figure 5:
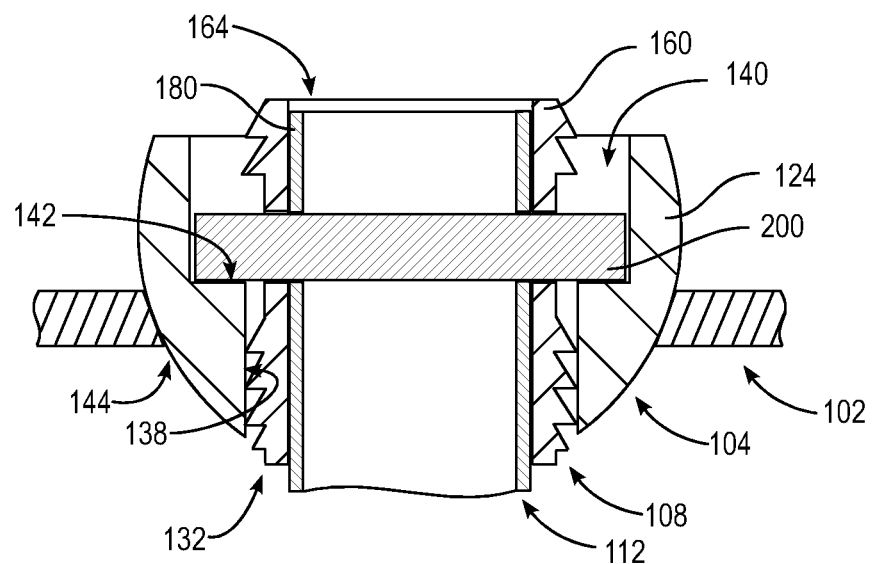
FIG. 5 is a side cross-sectional view of the hanging member, first resilient interface member, fastener peg, and the upper portion of the elongated support member of the fan support assembly of FIG. 3.

With reference to FIGS. 3 through 5, which illustrate the support assembly 22 for the fan assembly 10 in further detail, and continuing reference to FIGS. 1 and 2, the support assembly 22 includes a support bracket 102, a hanging member 104, a first resilient interface member 108, a downrod or an elongate support member 112, a second resilient interface member 116, and a receptacle 120.

Figure 6:
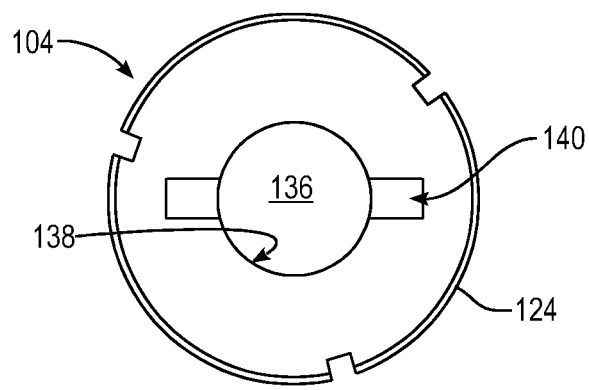
FIG. 6 is a top view of the hanging member of the fan support assembly of FIG. 2.

The hanging member 104 includes a generally hemispherical body 124 defining an upper opening 128, a lower opening 132, and a passage 136 (FIG. 6) extending substantially centrally through the hanging member 104 and bounded by an inner circumferential wall 138 of the body 124. A rectangular slot 140 extends downwardly from the top of the body 124 partially through the body 124. As can be seen from FIG. 5, the slot 140 is centered at approximately the same location as the center of the passage 136 and extends outwardly from the passage 136. The slot also includes a support surface 142 located at the bottom of the slot 140. Though the illustrated hanging member 104 is generally hemispherical, in other embodiments, the hanging member is conical, pyramidal, or has another desired shape. In some embodiments, the hanging member 104 includes additional features or cutouts from the views illustrated herein.

Referring now to FIGS. 2 and 5, the support bracket 102 includes a lower opening 144. The support bracket 102 is configured to mount to a structure 152, for example a ceiling of a building, by fasteners such as screws (not shown). In the illustrated embodiment, the structure 152 is horizontal, though in other embodiments the support bracket 102 is configured to mount to a sloped structure. The lower opening 144 has a diameter that is greater than the smallest cross-sectional diameter of the hanging member 104 and less than the largest cross-sectional diameter of the hanging member 104 such that the hanging member rests within the lower opening 144 with a portion of the hanging member 104 extending through the lower opening 144.

With reference to FIGS. 1 through 5, and with particular reference to FIG. 5, the first resilient interface member 108 includes a hollow generally cylindrical body 160 defining a central passage 164, and a plurality of circumferential ribs 168 extending outwardly from the cylindrical body 160. Each of the plurality of ribs 168 has a greater radius at the bottom of the rib 168 than at the top of the rib 168. The first resilient interface member 108 is positioned within the passage 136 of the hanging member 104 such that the ribs 168 contact the inner wall 138 defining the passage 136. The cylindrical body 160 further includes two fastener apertures 172 located circumferentially opposite one another in the cylindrical body 160. In one embodiment, the fastener apertures 172 are oval shaped, while in other embodiments the fastener apertures are circular or have a tapered or triangular shape. In one particular embodiment the resilient interface member 108 is formed of rubber, though other resilient materials are used in other embodiments.

The elongate support member 112 is a hollow substantially cylindrical body 180 having an upper end portion 184 and a lower end portion 188. The upper end portion 184 includes two fastener apertures 192 substantially aligned with the two fastener apertures 172 of the first resilient interface member 108. The lower end portion 188 also includes two fastener apertures 196 located circumferentially opposite from one another.

A fastener peg 200 extends through the fastener apertures 172 and 192 in the first resilient interface member 108 and the upper end portion 184 of the elongate support member 112, respectively. The fastener peg 200 rests on the support surface 142 of the slot 140 of the hanging member 104 in such a way that downward force exerted by the elongate support member 112 is transferred through the fastener peg 200 to the support surface 142 to retain the elongate support member 112 in a fixed axial position with respect to the hanging member 104.

The second resilient interface member 116 is substantially similar to the first resilient interface member 120, and includes a hollow generally cylindrical body 204 defining a central passage 208 and further includes a plurality of circumferential ribs 212 extending outwardly from the cylindrical body 204. Each of the plurality of ribs 212 has a greater radius at the top of the rib 212 than at the bottom of the rib 212. The second resilient interface member 116 is positioned such that the lower end portion 188 of the elongate support member 112 fits tightly within the central passage 208 of the second resilient interface member 116. The cylindrical body 204 further includes two fastener apertures 216 located circumferentially opposite one another and substantially aligned with the two fastener apertures 196 of the second end portion 188 of the elongate support member 112. In one embodiment, the fastener apertures 216 are oval shaped, while in other embodiments the fastener apertures are circular or have a tapered or triangular shape.

In one particular embodiment the second resilient interface member 116 is formed of rubber, though other resilient materials are used in other embodiments.

The receptacle 120 includes a hollow cylindrical body 220 having an inner surface 222, and a circular end plate 224 attached to the bottom of the hollow cylindrical body 220. The second resilient interface member 116 and the second end portion 188 of the elongate support member 112 are positioned in the hollow cylindrical body 220 such that the second resilient interface member 116 contacts the inner surface 222 of the hollow cylindrical body 220. Two fastener apertures 228 are defined in the hollow cylindrical body 224 substantially aligned with the fastener apertures 196, 216 of the second end portion 188 of the elongate support member 112 and the second resilient interface member 116, respectively.

A second fastener peg 240 extends through the fastener apertures 228, 216, 196 to prevent the elongate support member 112 and receptacle 120 from moving axially with respect to one another. The elongate support member 112 therefore supports the receptacle 120, which, as shown in FIG. 1, supports the motor and fan blade assemblies 14 and 18. The second fastener peg 240 includes an enlarged fastener head 244 and a pin hole 248 through which a pin 252 extends to prevent the second fastener peg 240 from sliding out of the fastener apertures 196, 216, 228.

The fan support assembly 22 is configured for easy installation by a user. The hanging member 104 is positioned in the support bracket 102 such that a portion of the hanging member 104 extends through the lower opening 144. In some alternative embodiments, the hanging member 104 is not installed in the support member 102 until after assembly of the remainder of the fan support assembly 22.

The upper portion 184 of the elongate support member 112 is then slid into the openings 128, 132 of the hanging member 104. The first resilient interface member 108 slides over the upper portion 184 of the elongate support member 112, and the fastener apertures 172 and 192 are aligned with one another. The upper fastener peg 200 is inserted through the apertures 172 and 192 and then aligned with the slot 140 in the hanging member 104. The hanging member 104 is raised until the upper fastener peg 200 rests on the lower surface of the slot 140, with the first resilient support member 108 compressed between the inner wall 138 of the hanging member 104 and the elongate support member 112. In some embodiments, the support bracket 102 is already mounted to a support structure 152, while in other embodiments the support bracket 102 is configured to be mounted to the support structure 152 subsequent to assembly of the fan support assembly 22.

The second resilient interface member 116 slides over the lower end portion 188 of the elongate support member 112, which is then inserted into the cylindrical body 220 of the receptacle 120 such that the second resilient interface member 116 is compressed between the inner surface 222 of the receptacle 120 and the elongate support member 112. The lower fastener peg 240 is inserted through the fastener apertures 196, 216, and 228 and the locking pin 252 is inserted through the pin hole 248 to retain the lower fastener peg 240 in the apertures 196, 216, and 228. In some embodiments, the receptacle 120 is already attached to the motor assembly 14, while in other embodiments the motor assembly 14 is attached to the receptacle 120 subsequent to installation of the support assembly 22.

The downward forces from the fan assembly 10 are transferred through the elongate support member 112 to the hanging member 104 and to the support bracket 102 to retain the fan assembly 10 at a fixed height. Vibrations generated by the motor assembly 14 during operation are damped by the first and second resilient interface members 108, 116 such that the transmission of vibrations between the motor and fan blade assemblies 14, 18 and the support structure 152 is minimized.

Upon installation of the first resilient interface member 108 and the elongate support member 108 in the hanging member 104, the ribs 168 are compressed between the inner wall defining the central passage 136 of the hanging member 104 and the outer surface of the elongate support member 112 such that the ribs 168 deform substantially symmetrically. The elastic reaction forces from the first resilient interface member 108 thus act substantially symmetrically on the elongate support member 112 to retain the elongate support member 112 centered within the central passage 136 of the hanging member 104.

There is a plurality of advantages arising from the various features of each of the embodiments of the assembly described herein. It will be noted that alternative embodiments of the assembly may not include all of the features described yet still benefit from at least some of the advantages of such features. Those of ordinary skill in the art may readily devise their own implementations of the assembly that incorporates one or more of the features and fall within the spirit and scope of the present invention as defined by the appended claims.

What is claimed is:

1. A support assembly for a fan, comprising:
   a hanging member including a support surface and an inner circumferential surface defining a central passage;
   an elongate support member having a first end portion and a second end portion, the first end portion extending into the central passage and defining a first fastener aperture and a second fastener aperture located circumferentially opposite from one another;
   a first resilient interface member compressed between the elongate support member and the inner circumferential surface of the hanging member, including a first plurality of outwardly extending ribs configured to engage the inner circumferential surface in the central passage, and defining a third fastener aperture substantially aligned with the first fastener aperture and a fourth fastener aperture substantially aligned with the second fastener aperture; and
   a first fastener member extending through the first, second, third, and fourth fastener apertures and supported by the support surface of the hanging member,
   wherein the hanging member defines a rectangular slot extending downwardly from an upper end portion of the hanging member, and the support surface is defined at a surface of the hanging member defining a bottom end of the slot.

2. The support assembly of claim 1, further comprising:
   a socket bracket configured to mount to a support structure and including a bottom end defining a socket opening having a socket diameter that is less than a maximum diameter of the hanging member, the hanging member being positioned within the socket bracket with the elongate support member extending through the socket opening.

3. The support assembly of claim 1, wherein the slot has a first length and the first fastening member has a second length, and the first and second lengths are substantially equal.

4. The support assembly of claim 1, wherein the hanging member has a generally hemispherical body.

5. The support assembly of claim 1, wherein the first resilient interface member has a first axial length and the hanging member has a second axial length, and the first axial length is greater than the second axial length such that the first resilient interface member protrudes beyond an upper end and a lower end of the hanging member.

6. The support assembly of claim 1, wherein the first resilient interface member is compressed between the inner circumferential surface of the hanging member and an outer circumferential surface of the elongate support member in such a way that the outwardly extending ribs exert a centering force on the elongate support member to center the elongate support member relative to the central passage of the hanging member.

7. The support assembly of claim 1, further comprising:
   a receptacle having a hollow cylindrical body defining a fifth fastener aperture and a sixth fastener aperture located circumferentially opposite one another;
   a second resilient interface member interposed between the second end portion of the elongate support member and the receptacle and including a second plurality of outwardly extending ribs configured to engage an interior surface of the hollow cylindrical body, and defining a seventh fastener aperture substantially aligned with the fifth fastener aperture and an eighth fastener aperture substantially aligned with the sixth fastener aperture; and
   a second fastener member,
   wherein the second end portion of the elongate support member defines a ninth fastener aperture substantially aligned with the fifth fastener aperture and a tenth fastener aperture substantially aligned with the sixth fastener aperture, and
   wherein the second fastener member extends through the fifth, sixth, seventh, eighth, ninth, and tenth fastener apertures to retain the receptacle and the elongate support member in a fixed axial position with respect to one another.

8. The support assembly of claim 1, wherein the first fastening member includes a cylindrical peg.

9. A fan assembly, comprising:
   a fan blade assembly including a plurality of fan blades;
   a motor assembly operatively connected to and configured to rotationally drive the fan blades; and
   a support assembly including:
      a hanging member including a support surface and an inner circumferential surface defining a central passage;
      an elongate support member having a first end portion and a second end portion, the first end portion extending into the central passage and defining a first fastener aperture and a second fastener aperture located circumferentially opposite from one another, the elongate support member being operatively connected to the motor assembly and configured to support the motor assembly;
      a first resilient interface member compressed between the elongate support member and the inner circumferential surface of the hanging member, including a first plurality of outwardly extending ribs configured to engage the inner circumferential surface in the central passage, and defining a third fastener aperture substantially aligned with the first fastener aperture and a fourth fastener aperture substantially aligned with the second fastener aperture; and a first fastener member extending through the first, second, third, and fourth fastener apertures and supported by the support surface of the hanging member, wherein the hanging member defines a rectangular slot extending downwardly from an upper end portion of the hanging member, and the support surface is defined at a surface of the hanging member defining a bottom end of the slot.

10. The fan assembly of claim 9, further comprising:

a socket bracket configured to mount to a support structure and including a bottom end defining a socket opening having a socket diameter that is less than a maximum diameter of the hanging member, the hanging member being positioned within the socket bracket with the elongate support member extending through the socket opening.

11. The fan assembly of claim 9, wherein the slot has a first length and the first fastening member has a second length, and the first and second lengths are substantially equal.

12. The fan assembly of claim 9, wherein the hanging member has a generally hemispherical body.

13. The fan assembly of claim 9, wherein the first resilient interface member has a first axial length and the hanging member has a second axial length, and the first axial length is greater than the second axial length such that the first resilient interface member protrudes beyond an upper end and a lower end of the hanging member.

14. The fan assembly of claim 9, wherein the first resilient interface member is compressed between the inner circumferential surface of the hanging member and an outer circumferential surface of the elongate support member in such a way that the outwardly extending ribs exert a centering force on the elongate support member to center the elongate support member relative to the central passage of the hanging member.

15. The fan assembly of claim 9, further comprising:

a receptacle having a hollow cylindrical body defining a fifth fastener aperture and a sixth fastener aperture located circumferentially opposite one another, the receptacle being operatively connected to the motor assembly;

a second resilient interface member interposed between the second end portion of the elongate support member and the receptacle and including a second plurality of outwardly extending ribs configured to engage an interior surface of the hollow cylindrical body, and defining a seventh fastener aperture substantially aligned with the fifth fastener aperture and an eighth fastener aperture substantially aligned with the sixth fastener aperture; and a second fastener member, wherein the second end portion of the elongate support member defines a ninth fastener aperture substantially aligned with the fifth fastener aperture and a tenth fastener aperture substantially aligned with the sixth fastener aperture, and wherein the second fastener member extends through the fifth, sixth, seventh, eighth, ninth, and tenth fastener apertures to retain the receptacle and the elongate support member in a fixed axial position with respect to one another.

16. The fan assembly of claim 9, wherein the first fastening peg includes a cylindrical peg.

* * * * *